(12) United States Patent
Wong et al.

(10) Patent No.: US 9,567,720 B2
(45) Date of Patent: Feb. 14, 2017

(54) OFFSHORE PLATFORM FOR A MARINE ENVIRONMENT

(76) Inventors: Carlos Wong, Macao (CN); Liqiang Chen, Macao (CN)

( * ) Notice: Subject to any disclaimer, the term of this patent is extended or adjusted under 35 U.S.C. 154(b) by 0 days.

(21) Appl. No.: 14/394,400

(22) PCT Filed: Apr. 11, 2012

(86) PCT No.: PCT/CN2012/073829
§ 371 (c)(1),
(2), (4) Date: Oct. 14, 2014

(87) PCT Pub. No.: WO2013/040890
PCT Pub. Date: Mar. 28, 2013

(65) Prior Publication Data
US 2015/0071711 A1    Mar. 12, 2015

(51) Int. Cl.
*E02B 17/00* (2006.01)
*B63B 35/44* (2006.01)
(Continued)

(52) U.S. Cl.
CPC .............. *E02B 17/00* (2013.01); *B63B 21/502* (2013.01); *B63B 35/44* (2013.01); *E02B 17/0008* (2013.01); *E02D 27/20* (2013.01); *E02D 27/425* (2013.01); *E02D 27/525* (2013.01); *F03D 13/25* (2016.05); *B63B 2021/505* (2013.01); *B63B 2035/446* (2013.01); *E02B 2017/0043* (2013.01); *E02B 2017/0073* (2013.01); *E02B 2017/0091* (2013.01); *F03D 13/22* (2016.05);
(Continued)

(58) Field of Classification Search
CPC .............................. E02B 17/00; E02B 17/0008

USPC .......................................... 405/203, 224–228
See application file for complete search history.

(56) References Cited

U.S. PATENT DOCUMENTS 3,823,563 A * 7/1974 Lovie .................... E02B 17/021
                                                        37/346
3,916,633 A * 11/1975 Lovie .................... E02B 17/021
                                                        37/346

(Continued)

FOREIGN PATENT DOCUMENTS

| CN | 101408027 A | 4/2009 |
| CN | 101148890 B | 5/2010 |
| GB | 1354549 A | 5/1974 |

OTHER PUBLICATIONS

PCT/CN2012/073829 International Search Report (ISR) dated Jun. 4, 2012.

*Primary Examiner* — Tara M. Pinnock
(74) *Attorney, Agent, or Firm* — Matthew J. Lattig; Charter IP, LLC

(57) ABSTRACT

An offshore platform for a marine environment includes a regulating tower section supporting at least one offshore wind turbine, at least one buoyancy tube connected between the regulating tower section, the at least one buoyancy tube having a tapered lower end extending to a seabed, and a concrete bed within the seabed. The tapered lower end is a cone-shaped bottom slab having a flat top surface with an apex of the cone-shaped bottom slab pointing downward towards the seabed. The concrete bed includes a reversed cone-shaped indentation to which the cone-shaped bottom slab is to be fixed within that was formed in the concrete bed by the cone-shaped bottom slab prior to the concrete bed hardening to a final design strength.

8 Claims, 15 Drawing Sheets

(51) Int. Cl.
*E02D 27/42* (2006.01)
*E02D 27/20* (2006.01)
*E02D 27/52* (2006.01)
*B63B 21/50* (2006.01)

(52) U.S. Cl.
CPC ....... *F05B 2240/93* (2013.01); *F05B 2240/95* (2013.01); *Y02B 10/30* (2013.01); *Y02E 10/727* (2013.01)

(56) References Cited

U.S. PATENT DOCUMENTS

| | | | | |
|---|---|---|---|---|
| 3,986,367 | A | * | 10/1976 | Kalpins ................... E02D 27/50 250/506.1 |
| 4,118,942 | A | * | 10/1978 | Liautaud ............... E02B 17/027 405/204 |
| 4,227,831 | A | * | 10/1980 | Evans ................... E02B 17/021 175/7 |
| 4,645,379 | A | * | 2/1987 | Grimsley ............... B63B 35/44 220/652 |

* cited by examiner

OFFSHORE PLATFORM FOR A MARINE ENVIRONMENT

CROSS-REFERENCE TO RELATION APPLICATION

The present application claims priority to PCT International Application No. PCT/CN2012/073829, filed Apr. 11, 2012 by the inventors, the entire contents of which is hereby incorporated by reference herein.

BACKGROUND

1. Field

The example embodiments in general relate to a partially floating, supported offshore marine platform for supporting offshore wind turbines, bridges and marine buildings, construction methods for installing the marine platform in a marine environment, and a method of assembling the platform at a harbor site.

2. Related Art

Foundation types for offshore marine platforms may be classified into three groups: the gravity type, pile supported type, and the floating type covering water depths from shallow, medium to deep, respectively. For wind turbine and bridge structures, the horizontal forces due to wind, waves, surges and earthquakes are likely to be the controlling load cases, since the structural dead weight is small. However, this may not be the case for building structures on the offshore marine platform, as the gravity load is relatively large.

In the case where horizontal forces control the design, the use of tension piles is more effective than using ballast for the increase of dead weight of the foundation, except that the bearing stratum for the foundation is strong, i.e., bedrock, so the bearing stratum may sustain the weight of the ballasted structures. On the other hand, in the case where vertical forces control the design of the marine platform, the use of a gravity type foundation is effective if the founding layer is close to the surface of the seafloor (i.e., shallow depths), such that excavation of soft materials in the seafloor will not be in a substantial quantity. The gravity type will be advantageous; but to reduce the strength demand for the founding layer, it is desirable to either increase the contact area of the platform or reduce the loads thereon. In the case of a piled foundation, the challenges are performing piling operations at sea, as well as the construction of a pile cap for the platform in the water.

SUMMARY

An example embodiment is directed to an offshore platform for a marine environment, the platform being configured to support offshore wind turbines, bridges and marine buildings thereon and adapted for a water depth greater than 5 meters in the marine environment. The platform includes a regulating tower section supporting at least one offshore wind turbine thereon, at least one hollow, cylindrical buoyancy tube having an upper end attached to the regulating tower section and a tapered lower end extending downward from the tower section towards a seabed of the marine environment, and a concrete bed cast beneath a surface of the seabed and configured to support the tapered lower end of the at least one buoyancy tube therein. The tapered lower end is a cone-shaped bottom slab having a flat top surface and with the apex of the cone-shaped bottom slab pointing downward towards the seabed. The concrete bed within the seabed includes a mirror-image or reversed cone-shaped indentation that is to receive the cone-shaped bottom slab therein, the reversed cone-shaped indentation having been formed in the concrete bed by the cone-shaped bottom slab of the at least one buoyancy tube prior to the concrete bed hardening to a final design strength. The cone-shaped bottom slab is fixedly secured within the reverse cone-shaped indention of the concrete bed to support the regulating tower section with the at least one offshore wind turbine thereon.

Another example embodiment is directed to offshore platform for a marine environment. The platform includes a plurality of buoyancy tubes, at least one of which supports a wind turbine thereon which is attached at an upper end thereof. A lower end of each buoyancy tube is configured as a cone-shaped bottom slab with a flat top surface, where an apex of the cone-shaped bottom slab points downward towards the seabed. The platform further includes a plurality of horizontal beams interconnected between the buoyancy tubes so that the platform has a triangular shape, and a plurality of concrete beds formed within the seabed, each concrete bed associated with a respective buoyancy tube. Each concrete bed includes a reversed cone-shaped indentation to which the cone-shaped bottom slab of its corresponding buoyancy tube is to be fixed within, the indention having been formed in the concrete bed by the cone-shaped bottom slab prior to the concrete bed hardening to a final design strength.

BRIEF DESCRIPTION OF THE DRAWINGS

The example embodiments will become more fully understood from the detailed description given herein below and the accompanying drawings, wherein like elements are represented by like reference numerals, which are given by way of illustration only and thus are not limitative of the example embodiments herein.

PARTS LIST

Figure 1:
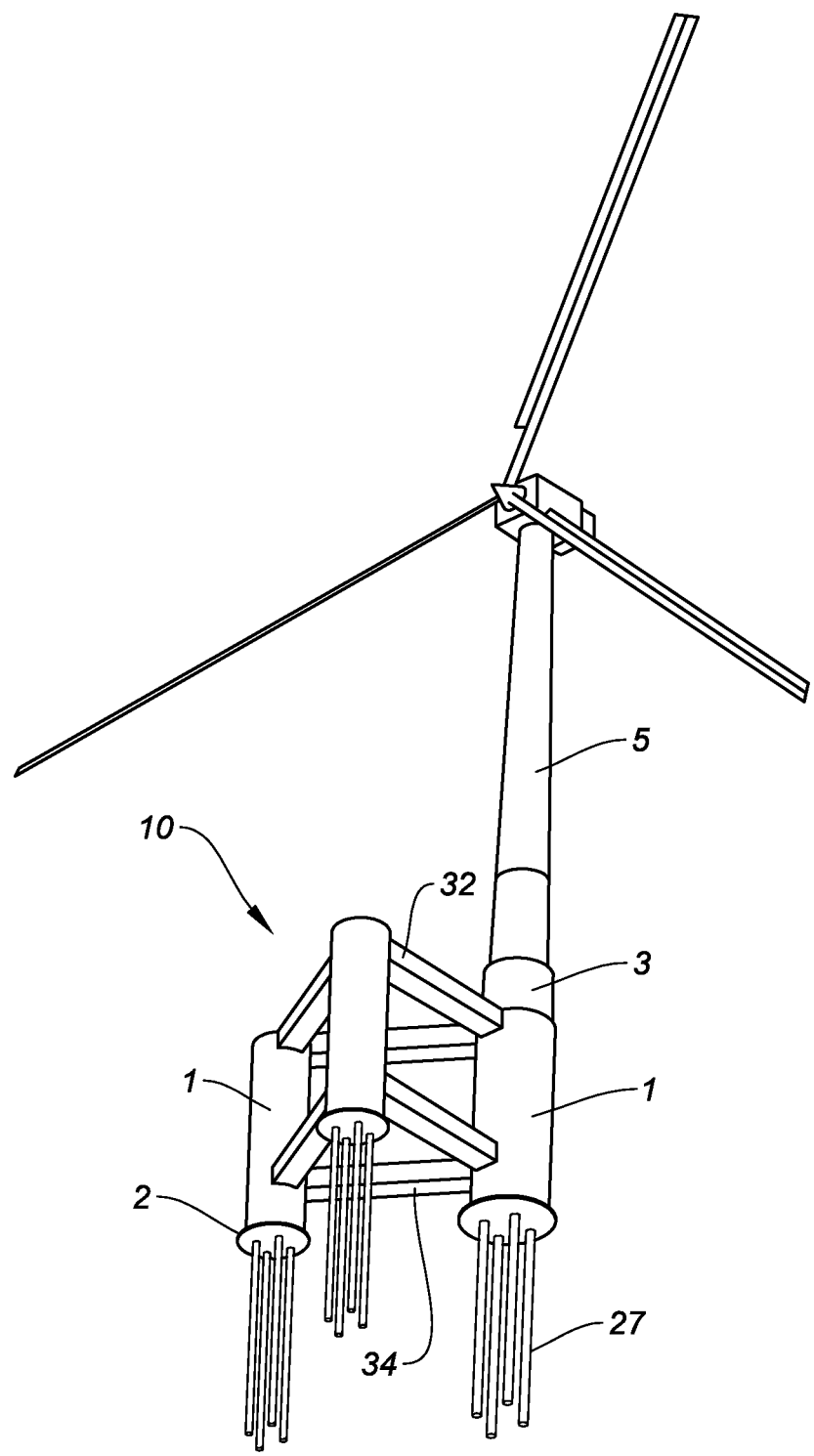
FIG. 1 is a perspective view of a marine platform in a marine environment supporting a wind turbine thereon, according to an example embodiment.

1. Floater/buoyancy tube
2. cone-shaped bottom slab
3. Regulating tower section
4. Stiffened ring slab
5. Wind turbine
6. Seabed/seafloor
7. Rubble wall/mount
8. Sea surface
9. Concrete bed
10. Partially floating supported offshore marine platform
11. Mirror-image, reversed cone-shaped indentation
12. Cement grout or simply grout
13. Soil/sand strata
14. Founding stratum/founding layer
15. Pothole
16. Top slab
17. Pile cap
21. Bridge pier
22. Dredging arm
23. Dredger
24. Boring plant/machine
25. Casing
26. Operation vessel
27. Small diameter piles
28. Piling plant/machine
31. Tremie concrete pipe
35. Bridge column
36. Capping beam
37. Pressure pipe
38. Valve
39. Recess hole
40. Bedrock
41. Embedded bar connectors
42. Pile cap reinforcement bars
43. Exposed steel bars in piling
45. Raking pile
46. Multiple cone shapes
47. Mirror-image, reversed, multi-cone-shaped indentations
48. Short steel bars

DETAILED DESCRIPTION

As will be described in further detail hereafter, example embodiments of the present application address the challenges discussed above in the background section, by describing the employment of a cone matching technique to assist in attaching a hollow cylindrical buoyancy tube vertically arranged in a marine environment, also referred to as a "floater" hereafter, to a concrete bed that is formed in the seafloor, so as to compensate part of the gravity load at temporary and/or permanent states. Additionally, the example marine platform and construction methods therefor may include a piling support arrangement comprising a plurality of pilings that are inserted through the inside of the hollow floater and down into the marine environment to connect the floater to bedrock, thereby accomplishing piling installment tasks without requiring an expensive piling vessel at sea.

Innovative techniques exemplified by the example embodiments may further include replacing the usual solid vertical pier or column used in a conventional offshore platform with the hollow, cylindrical, vertically arranged buoyancy tube (floater) which provides buoyancy, so that a single floater or a plurality of interconnected floaters forming the marine platform may float in a body of water. The buoyancy provided by the floaters reduces the bearing pressure on the founding stratum in a temporary state or in a permanent state. By employing a unique cone matching technique described hereafter in more detail, the bottom of the floater can easily be fixed to the seafloor. As the floater interior is a relatively large space, a piled foundation for the marine platform can be realized by installing small diameter piles through the inside of the floater and down into bedrock, and by constructing the pile cap therein, which secures upper ends of the piles within the floater. Furthermore, these procedures may be performed in a dry working environment.

In one example, as illustrated in more detail hereafter, the partially floating supported offshore marine platform may include a plurality of beams, each horizontally arranged and connected between adjacent floaters so as to form the marine platform. The floater as previously noted is a hollow, cylindrical member capped at its upper and lower ends by slabs. The lower end may be tapered; for example, the bottom slab may be conically-shaped (as a single cone shape or as a plurality of cone-shapes) with the apex of the cone pointing downward toward the seabed/seafloor. The floater has a buoyancy capable of allowing the floater itself to float, and compensates part or all of the dead weight of the marine platform when the platform is deposited in a body of water (marine environment).

The floaters and beams forming the marine platform structure are constructed by a match casting segmental construction method, which includes the casting of a number of matching segments in a factory or casting yard to assemble the floaters, beams, and deck (if any); the segments are joined together in a harbor or dock side so as to finally assemble the floaters and horizontal beams into a marine platform that can float in a body of water.

In one example embodiment, the marine platform comprises only a single, vertically aligned, hollow cylindrical floater capped at both ends by slabs, with the bottom slab having a single cone shape or multiple cone object shapes with the apex pointing downward.

In another example, the floater may be tapered out at its lower end so that the bearing pressure on the founding stratum can be minimized to a small value for gravity type floaters. This tapered out floater can accommodate raking piles (piles installed at an angle) to be installed easily in a piled floater.

In general, a cone matching method unique to this patent application is used to fix the marine platform into the seabed. In general, and at the corresponding location of where the floater (or floaters) of the platform is to be secured in the seabed, the bottom cone-shaped slab of the floater, which points vertically down toward the seafloor, contacts and is secured to a mirror-image indentation of the cone shape of the bottom slab, or "reversed cone" that is impressed of formed into a concrete bed within the seabed (the concrete bed having been made by a mass concrete deposit in a pothole formed by removing soft materials on the seafloor, exposing the founding layer).

In general, the above steps form part of an example construction method for installing the marine platform in a marine environment, to be further illustrated in detail in accordance with the example embodiments. For example, the method may include, at the corresponding location of where the cone-shaped bottom slab of the floater is to be attached in the seafloor, excavating, dredging or sucking away soft material to expose a firm stratum of material in the seabed that can withstand the expected load of the marine platform. The marine platform is then floated in position and at the same time the concrete bed is prepared by filling the pothole(s) left by the excavation in the seafloor with concrete from construction vessels using a pipe down to the seafloor according to established underwater concreting technology. In an example, the quantity of concrete used for forming the concrete bed should be such that the cone shape of the bottom slab may be completely immersed and covered up by the concrete bed.

Prior to the concrete setting in the pothole to form the concrete bed, the marine platform is lowered down within the marine environment (water) by adjusting its buoyancy with water in-take until the cone-shaped bottom slab(s) of the floater(s) are completely immersed within the still-wet concrete bed. The orientation and level of the marine platform is maintained until the concrete starts to set, i.e., starts to harden. At that point, high pressure water is used to flush separate the two faces of the cone-shaped bottom slab(s) and the concrete bed and the platform is thereafter raised off the concrete bed, thereby revealing the mirror-image, reversed cone indentation(s) that were formed in the concrete bed by the cone-shaped bottom slabs of the floater(s).

Once the concrete of the concrete bed has reached its design strength, the platform is lowered again so that the cone-shaped bottom slab of the floater contacts the reversed cone-shaped indentation in the concrete bed. Level and orientation of the marine platform is maintain, with an gap(s) formed between faces of the bottom slab and concrete bed cement grouted via pipes pre-installed within the interior body of the floater; this completes installation of the platform in the seabed of the marine environment.

In another example, a pressure piping system may be installed in the floater to deliver high pressure water jets from a high pressure water source, and cement grout from a grout source through openings that are formed in the bottom of the floater. Pumping machinery may be located inside the floater, or from outside in the construction vessels.

According to another example as to be described in further detail hereafter in the example embodiments, a piling support arrangement may be provided for the marine platform (to accommodate deeper water depths, for example). Piling may be added to the platform foundation in cases where the concrete founding stratum (concrete bed) for the cone-shaped bottom slab of the floater cannot resist further loads imposed on the founding stratum.

In providing the piling support arrangement, generally a plurality of small diameter piles are installed through the inside space of the floater with their lower ends to be secured in bedrock; raking piles may be installed if necessary, and a pile cap is then cast within the lower end of the floater to secure the upper ends of the piles.

In additional detail, procedures for installing the small diameter piles may include, but are not limited to: casting a plurality of recess holes without steel bars in the bottom slab at the piling locations; installing each pile by one of boring/drilling/driving using established piling technology, where the small piling plant (machine) may either rest on the floater top slab, or rest within the floater interior on top of the bottom slab once the ingress of water has been dealt with. Each pile penetrates through a recess hole in the cone-shaped bottom slab, so as to extend down into and through the concrete bed, through the soil/sand strata beneath the seabed, with their lower ends finally socketed into bedrock.

Once the piles are secured in bedrock, the floater interior is dewatered by pumping, or by adding concrete at the bottom of the floater to form a concrete plug which stops water seeping out; the interior of the floater thus realizes a dry working environment. Then, upper ends of the piles are cut to a desired level and made ready for a pile cap casting according to established procedures. For example, pile cap reinforcement bars for the pile cap are connected at their ends and fixed (by lapping steel) to bar connectors embedded within the interior floater wall at a lower end thereof. The pile cap is then cast with concrete to complete installation of the piling support arrangement.

In an aspect, a stiffened ring slab may be optionally joined to the bottom slab of the floater to increase the bearing surface area in order to reduce the bearing stress in the soil stratum of the seabed. In another aspect, a circular, bottomless, steel can may be dropped into the excavated pothole with a diameter that is larger than the outer most diameter of the floater or stiffened ring slab. Reinforcement bars may be welded to an inner face of the steel can over the lower part of the concrete bed for the confinement of concrete and reinforcing of the to-be-formed concrete bed. In a variant, the bottomless steel can may be replaced by dumping stone and gravel at the perimeter of the pothole to form a rubble wall/mount that confines the concrete.

In another aspect, the bottom slab of the floater and concrete bed underneath can be joined together by post-drilling holes through the two with grouted steel rods to provide a shear key function. In a further aspect, a plurality of individual platforms may be joined to form a large platform.

Another example as to be described in further detail hereafter in the example embodiments is directed to a method of assembling the marine platform at a harbor site, the platform to be used for supporting offshore wind turbines, bridges and marine buildings in a marine environment. The method, in general, includes but is not limited to the following steps below.

Initially, segments which are to make up the floaters and horizontal beams are match casted in a factory or casting yard. The floater segments are transported to the assembly harbor site and towed to a specific assembly location at the harbor site. For the assembly, at least three (3) guiding piles are driven into the seabed at the assembly location for the floater; these guiding piles are capable of supporting an overhead frame/truss for lifting the segments. The segments which are to make up the floater are then placed in the assembly location and confined by the guiding piles, the segments are verified to be able to float on the water, using the guiding piles to adjust the position, and then joined together to realize the floater. For the segment of the floater that is to include the connection points for the horizontal beams, an overhead frame/truss is used to hang the section of the floater so that the connection of beams to floater can be performed above water level. However, if this section of the floater has adequate buoyancy, then the overhead frame/truss is not required.

A next step is to float in or bring in (such as by barge) those horizontal beams to be connected to the floater(s). By using temporary support in the guiding piles, the beams to be connected are lifted and temporarily fixed into position on the floater(s). Any gap at the joints or connection points between the floater and an end of a beam is then fixed and lapped with steel bar from both ends; shutter formwork is erected, and joints at the beam/floater interfaces are cast with concrete; this completes assembly of the marine platform. As the now-completed marine platform is designed to be able to float on its own, the guiding piles and overhead frame/truss are removed from the assembly location so as to free the platform, which is now free to be towed away.

The advantages of the above-described partially floating supported offshore marine platform for offshore wind turbines, bridges and building structures include the adaptability for different water depths and different seabed conditions. For example, and for shallow water or where bedrock or the founding stratum is close to the seabed level, a single gravity-type floater can be used by using the matching cone and reverse cone technology as described above to fix the platform on the seabed. Additionally, for medium depth water, a single or multiple floater platforms can be used with small diameter drill-in piles or drilled in steel H-piles. The small piling machine rests on the platform top slab to perform the piling work above sea level, in dry conditions. Therefore, large and expensive offshore piling vessels are no longer needed. Furthermore, the risk associated with manual working under water is now eliminated.

Example embodiments hereafter also relate to another construction method for installing the marine platform in a marine environment. In general, the steps in this construction method include but are not limited to the following. Initially, the marine platform is floated into the marine environment at a desired location for installation; its co-ordinates and orientation are adjusted as needed to maintain its position and sink the platform to the bottom of the seabed by taking in water. When it is sitting firmly on the seabed, high pressure jets from the nozzles in the bottom slab are used to clear soft material until a bedrock surface or the designed founding layer is exposed, thereby creating potholes in the seabed.

Next, and using a built-in tremie concrete down pipe provided in the floaters, wet concrete is poured into the water-jet cleared pot holes and at the same time, the platform position and level is maintained to allow the concrete to completely cover the cone-shaped bottom slab of the floater, up to the level of the stiffened ring slab (if present). After the concrete becomes hardened, the platform is raised by reducing its water ballast, so that the concrete bed can be cured without the influence of wave and current action that would be transferred by the platform onto the concrete bed, were the bottom slab to remain on the concrete bed. Thereafter, the remaining procedures are similar to those described in the above construction method and are not repeated here.

General concepts of the example embodiments having been described above, the following FIGS. 1-4 should be referred to for describing an example embodiment directed to a partially floating, supported offshore marine platform 10 for offshore wind turbines, bridges and marine buildings, the platform adapted for a water depth of at least five (5) meters in a marine environment, more specifically by a work example 1 below.

Work Example 1

Referring to FIGS. 1-4, the intention is to install a marine platform 10 as described in the example embodiments in a marine environment of an open sea that is 25 m deep for the support of a 3 MW horizontal axis wind turbine 5. The marine platform 10 constructed in accordance with the example embodiments has the benefits of a hollow, cylindrical, vertically disposed buoyancy tube ("floater 1") having a buoyancy that can offset up to ½ of its dead weight. The ballast of water inside the floater 1 can change the base frequency of the structure so as to avoid the max wind energy spectrum earthquake energy.

In the example of FIG. 1, which is a perspective view of an example marine platform 10 in a marine environment supporting a wind turbine 5 thereon, the marine platform 10 is shown to include three (3) vertically aligned floaters 1 connected by primary and secondary horizontal beams 32, 34; these floaters 1 are supported by a partial buoyancy force. In this platform 10, a plurality of small diameter piles 27 are installed at the bottom of each of the floaters 1. The piles 27 are anchored at their lower ends to the bedrock 40 (shown in later figures) or to the founding stratum 14 (shown in later figures). Additionally, a bottom slab 2 of the floater 1 may be cast in a conic shape, with its cone pointing downward toward the seabed 6 (see FIG. 4, for example).

Figure 2A:
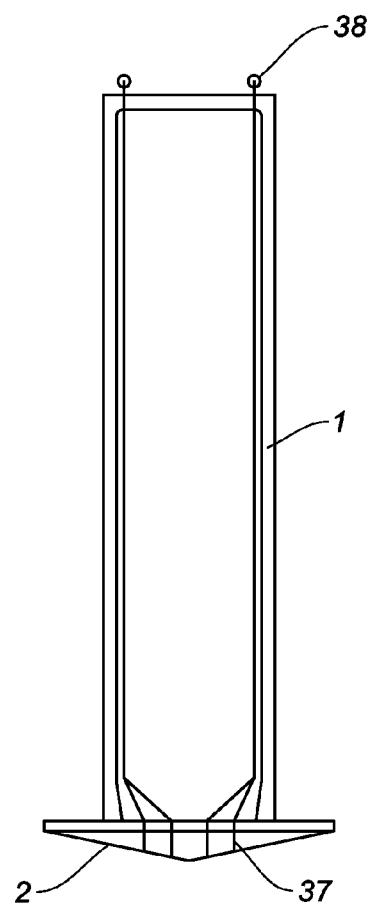
FIG. 2A is a front view of an example floater of the marine platform.
Figure 2B:
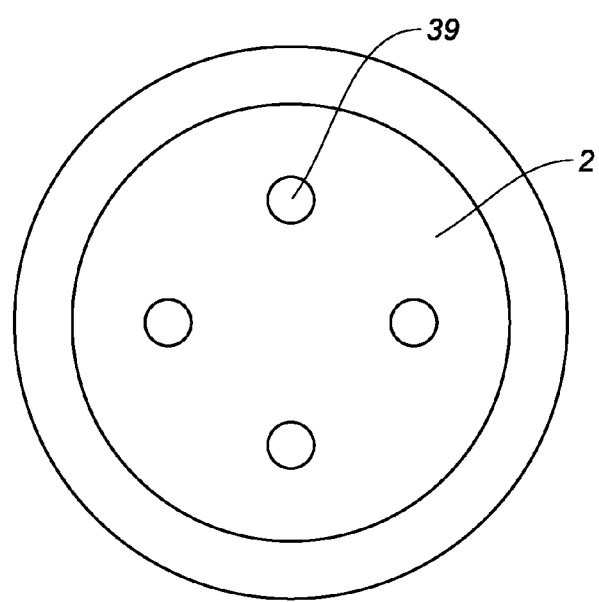
FIG. 2B is a bottom view of the cone-shaped bottom slab of floater 1.
Figure 2C:
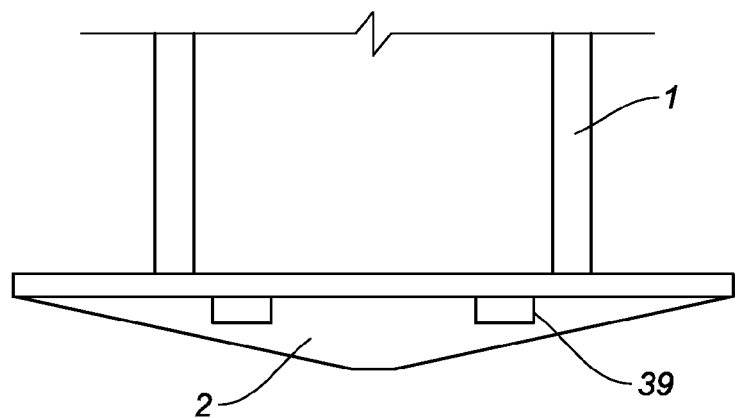
FIG. 2C is an enlarged, front view of a lower section of floater 1.
Figure 4:
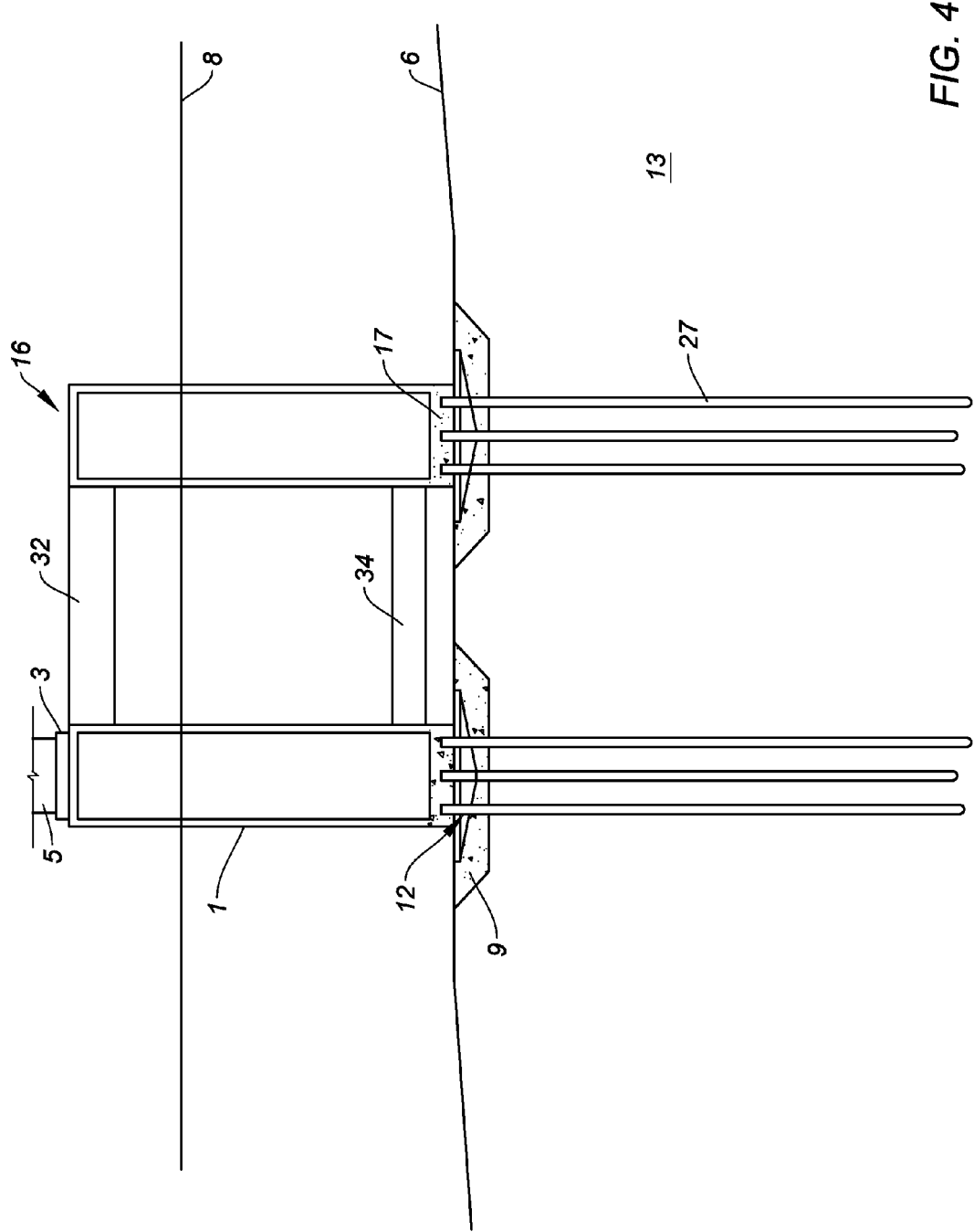
FIG. 4 is a side view of a marine platform with piling support in a marine environment, according to another example embodiment.

As best shown in FIG. 2B, which is a bottom view of the cone-shaped bottom slab 2 of floater 1, and also referring to FIG. 2C which illustrates an enlarged, front view of a lower section of floater 1, the inner face of the cone-shaped bottom slab 2 has a plurality of circular recess holes 39 formed therein. Referring now to FIG. 4, illustrating a front view of a marine platform 10 with piling support in a marine environment, each pile 27 is guided down into the interior of floater 1 and through these recess holes 39 (see FIG. 2C), so as to penetrate into and through a concrete bed 9 formed in, and soil/sand strata 13 beneath the seabed 6, with lower ends of the piles 27 thereof to be finally socketed into the bedrock 40 or founding stratum 14.

Figure 3:
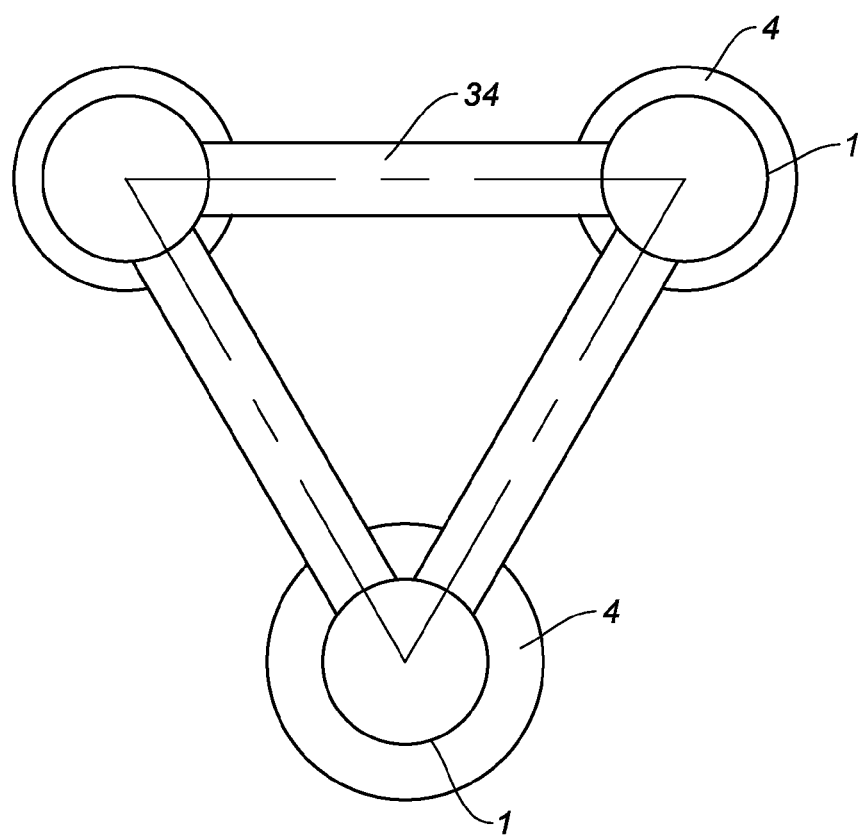
FIG. 3 is a bottom view of the marine platform in another configuration, according to an example embodiment.

FIG. 1 further shows three floaters 1 inter-connected with beams 32, 34 to form a platform 10 with one of the floaters 1 to be installed with a horizontal axis wind turbine 5 disposed vertically thereon. It is also possible to use one single floater 1 to form the platform 10, as shown hereafter in FIG. 9. As best shown by FIG. 3, which is a bottom view of marine platform 10 in another configuration, a single-floater platform 10 may comprise a vertically disposed floater 1 and a stiffened ring slab 4 extending outward from bottom slab 2 at the bottom of the floater 1, with or without the small diameter piles 27.

In a multi-floater platform as illustrated in FIG. 1, a spatial structure is formed by connecting a plurality of vertically disposed floaters 1 with the horizontal beams 32, 34, with or without small diameter piles 27 in group fixed to the bottom of the floaters 1. Although FIG. 1 shows a marine platform 10 configured in a triangular shape in plan, the example embodiments are not so limited, as marine platform 10 may be configured in other shapes, such as square, rectangle, pentagon, etc. The cross-section of the floater 1 can also be a polygon other than a circular shape. In this work example 1, example dimension and member sizes may be taken as: height of floater 1—30 m; floater 1 wall thickness—0.35 m; top slab 16 thickness—0.35 m to 0.5 m; cone-shaped bottom slab 2 thickness—0.35 m to 0.6 m.

In FIG. 1, marine platform 10 consists of hollow, cylindrically-shaped floaters 1. However, the floater 1 can be of a tapered shape with its bottom diameter greater than the top diameter to increase stability and reduce the bearing pressure on the bearing stratum. Furthermore, the stiffened ring slab 4 can be added to the bottom of the floater 1 to increase the surface area further, in order to further reduce the bearing pressure.

As further shown in FIG. 1, the marine platform 10 may further include a regulating tower section 3 vertically disposed on top of the floater 1 that supports the wind turbine 5. The height of the regulating tower section 3 should be such that a portion of the regulating tower section extends above the max designed wave height in the marine environment.

As best shown in FIG. 2A, which is a front view of a floater 1, the interior of the floater 1 may be pre-installed with a pressure piping system that comprises a plurality of pressure pipes 37 for pumping high pressure water (via one or more valves 38 arranged at the top of floater 1 connected to a water source) or cement grout (via valves 38 connectable to a cement grout source) to the bottom water side of the floaters 1. The valves 38 control the flow of high pressure fluids through pressure pipes 37. For example, pumping of high pressure water jets or cement grout may be done by coupling the inlet (valves 38) with a water pump or concrete/cement grouting plant. The outlets of the pressure pipes 37 are at the water side of the bottom slab 2. The water pipes 37 are used for flushing the seabed 6, and to flush open a gap that is formed between the cone-shaped bottom slab 2 and the concrete bed 9, as to be described in more detail hereafter.

Optionally, the floater 1 can be filled with water or sand to increase its self weight in order to further stabilize the floater 1 in the marine environment. Additionally, for a 3 MW horizontal axis wind turbine 5, a steel tower thereof will have a height of approximately 65 m; the nacelle is placed on top of the tower and has a weight of approximately 400 t.

In the work example 1, which illustrates a design of a marine platform 10 for wind turbine support, one issue is to resist the uplifting force in the floater 1 induced by a huge overturning moment. In the calculation, the small diameter piles 27 may have a diameter of about 0.3 m, the portion of the piles 27 that are embedded into bedrock 40 have a length of about 3 m, reinforcement bars 42 for a pile cap 17 to be formed within the floater 1 (as described hereafter) are 3×50 mm, high pressure grouted mini-pile. A horizontal load on platform 10 is resisted by the stiffened cone-shaped bottom slab 2 which translates the force to the concrete bed 9, which in turn translates the force into the bearing stratum 13.

Work Example 2

Figure 12:
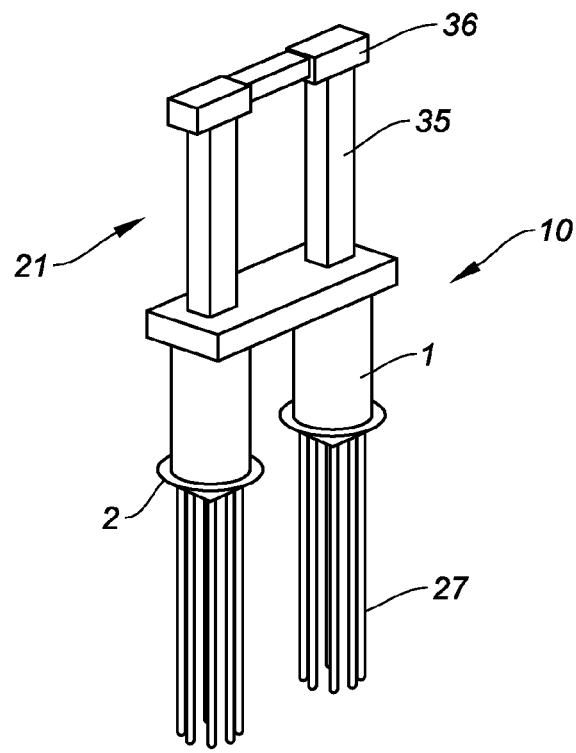
FIG. 12 is a perspective view which shows installation of a bridge pier supported on a marine platform, according to another example embodiment.

FIG. 12 is a perspective view which shows a bridge pier 21 comprising bridge columns 35 and a capping beam 36 which supports bearings of the bridge pier 21. The bridge pier 21 is supported on marine platform 10 which in turn is supported by two (2) floaters 1 and a plurality of the small diameter piles 27. In this work example, floater 1 may have a diameter of 8 m, a height of 30 m, wall thickness 0.4 m for water depth 30 m, soil/sand layer 25 m, with the small diameter piles 27 to be socketed into bedrock 40.

Work Example 3

Figure 13:
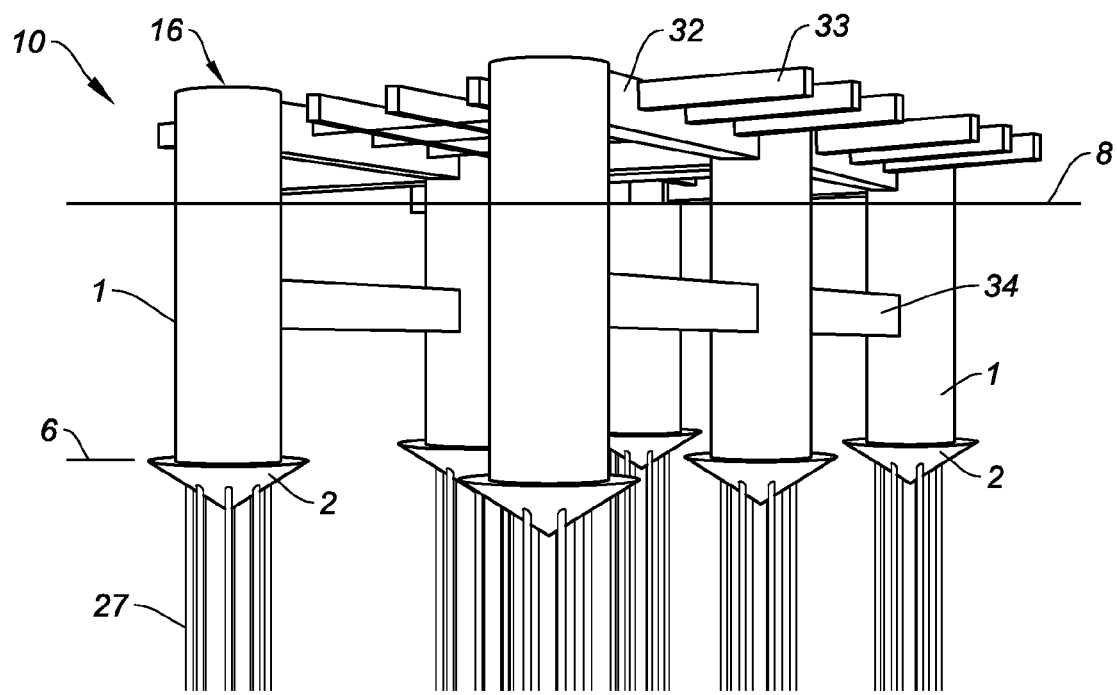
FIG. 13 is a perspective view of a grid formation of a marine platform employing a plurality of interconnected floaters.

FIG. 13, which is a front perspective view of a marine platform 10 in another configuration, shows the platform 10 in a grid formation with a plurality of floaters 1 located at respective nodes of the grid. The main structure frame is formed by connecting main (primary) beams 32 arranged horizontally between adjacent floaters 1 at upper ends thereof, and connecting optional main (secondary) beams 34 arranged horizontally between adjacent floaters 1 at lower ends thereof. A plurality of additional beams 33 branch out to suit the building layout.

Figure 14:
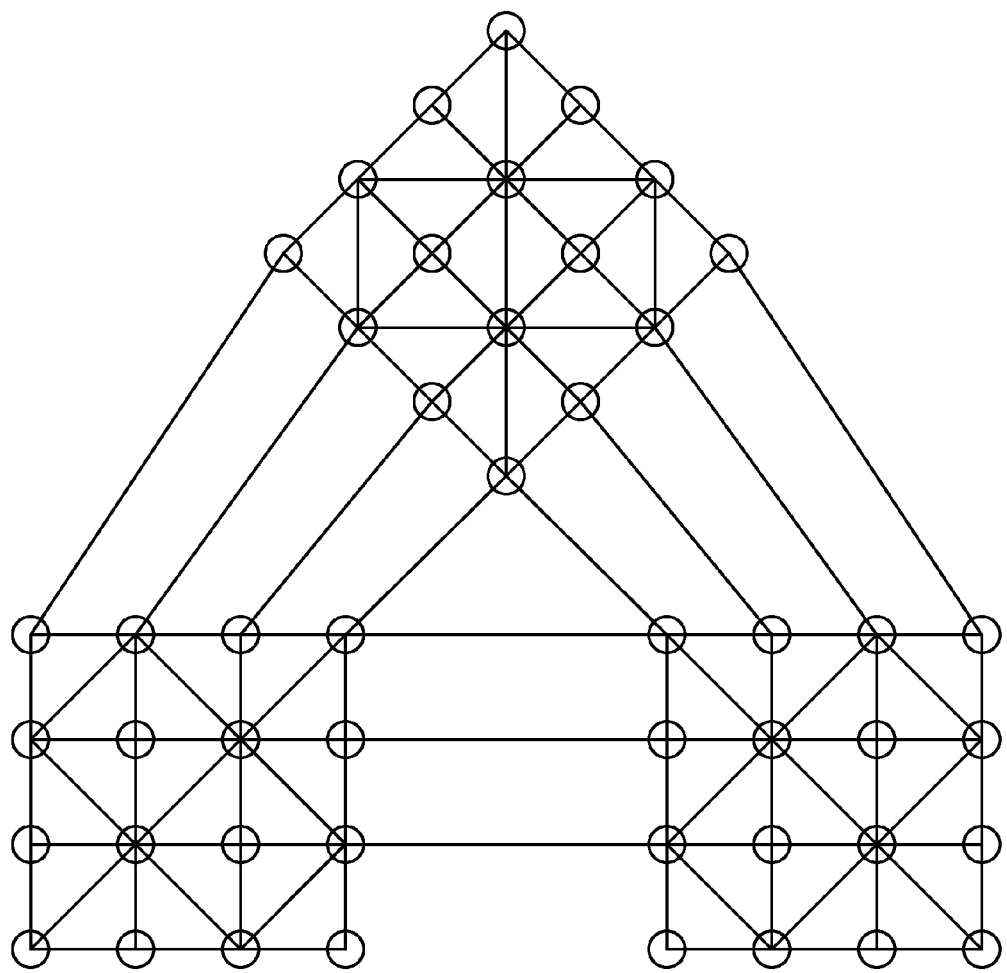
FIG. 14 is a top view illustrating a multi-platform concept comprising a number of interconnected modules.

In an example, a basic module for an offshore building platform may include four (4) cylindrical floaters 1 supporting a grid of beams 30 m×30 m overall. The size of the platform may be increased by combining a number of the basic modules. For example, FIG. 14 is a top view illustrating a substantially larger platform comprising a number of interconnected modules. In this work example, the dimensions and sizes of structural members comprising the marine platform 10 may be the following: water depth—30 m; soil/sand strata 13—20 m; floater 1: diameter—8 m, height—30 m, wall thickness—0.4-0.5 m, top slab 16 and bottom slab 2 thicknesses—0.4-0.6 m.

Work Example 4

The following FIGS. 5-8B should be referred to aid in understanding a construction method for installing the marine platform 10 in the marine environment for supporting offshore wind turbines, bridges and marine buildings. In particular, FIGS. 5-8B illustrate steps in the construction method for the installation of a tapered, single floater platform 10 on the seabed 6.

Figure 5:
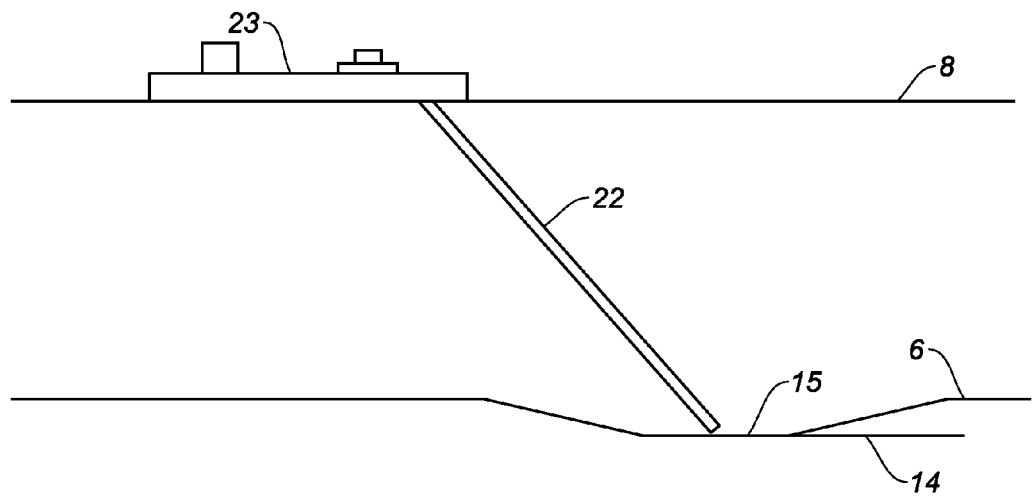
FIG. 5 is a side view to illustrate dredger operations in the marine environment to describe a step of excavating a seabed.

FIG. 5 is a side view to illustrate dredger operations in the marine environment to describe a step of excavating seabed 6 beneath the surface 8 of the water. Specifically, FIG. 5 shows a dredging arm 22 from a dredger vessel 23 on the water surface 8 extending down to the seabed 6 so as to excavate soft materials in the seabed 6 to expose the founding stratum 14. A pothole 15 is formed in seabed 6 due to the excavation thereof.

Figure 6:
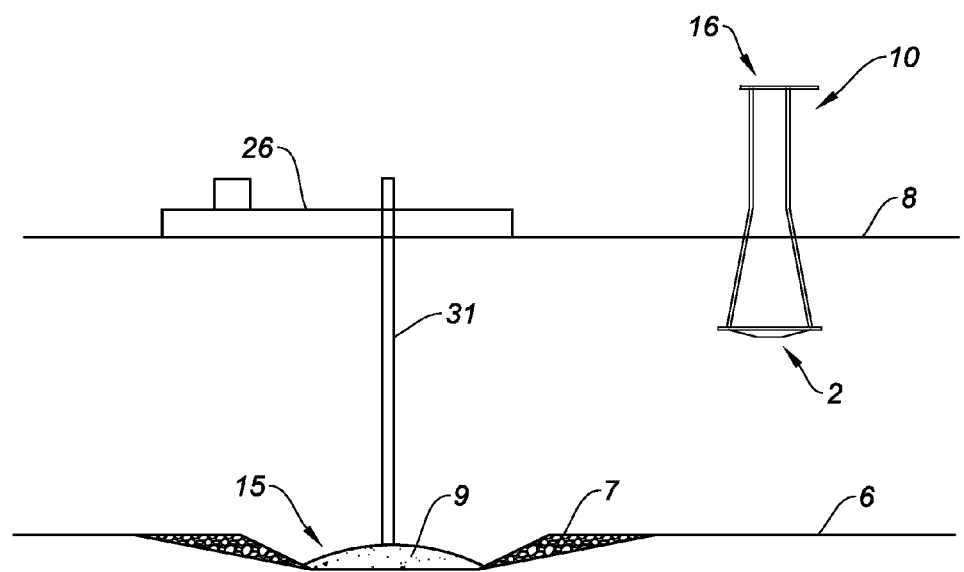
FIG. 6 is a side view to illustrate a step of concrete bed forming operations in the seabed of the marine environment.

FIG. 6 is a side view to illustrate a step of concrete bed forming operations in the seabed 6 of the marine environment. Specifically, FIG. 6 illustrates an operation vessel 26 on the water surface 8 employing a tremie concrete pipe 31 that extends between the operation vessel 26 and the pothole 15 to pour concrete in the pothole 15 so as to form a concrete bed 9 confined by the rubble wall/mount 7 (built up on sides of pothole 15 in advance), and at the same time a single-floater marine platform 10 is shown being floated in at water surface 8.

Figure 7A:
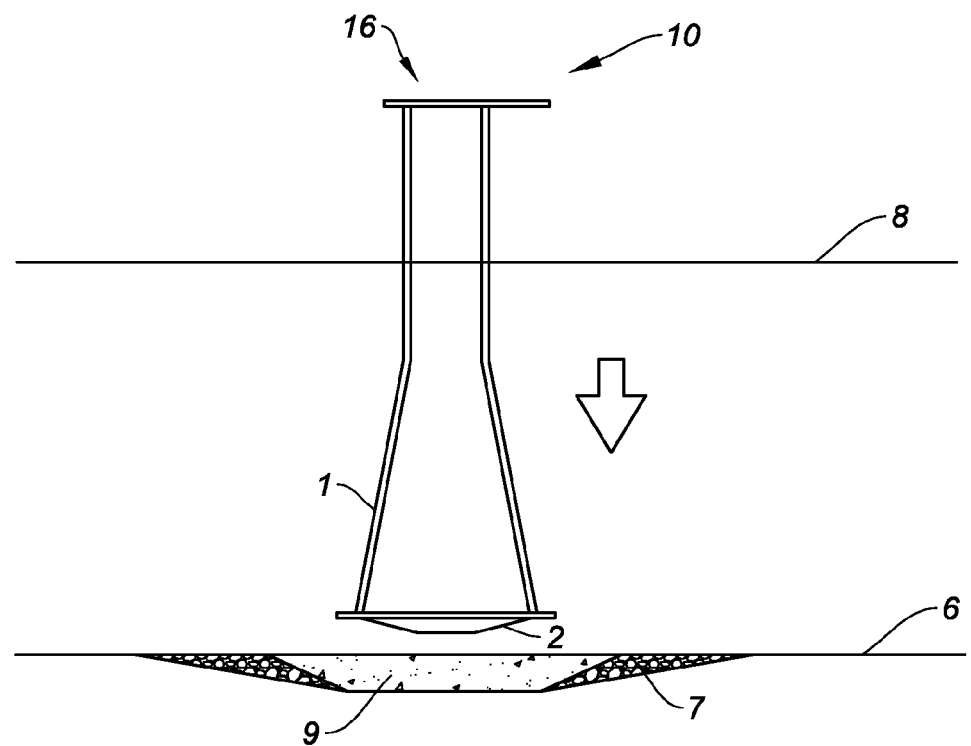
FIG. 7A is a side view of a single-floater platform to illustrate a step of hovering platform just above the concrete bed.
Figure 7B:
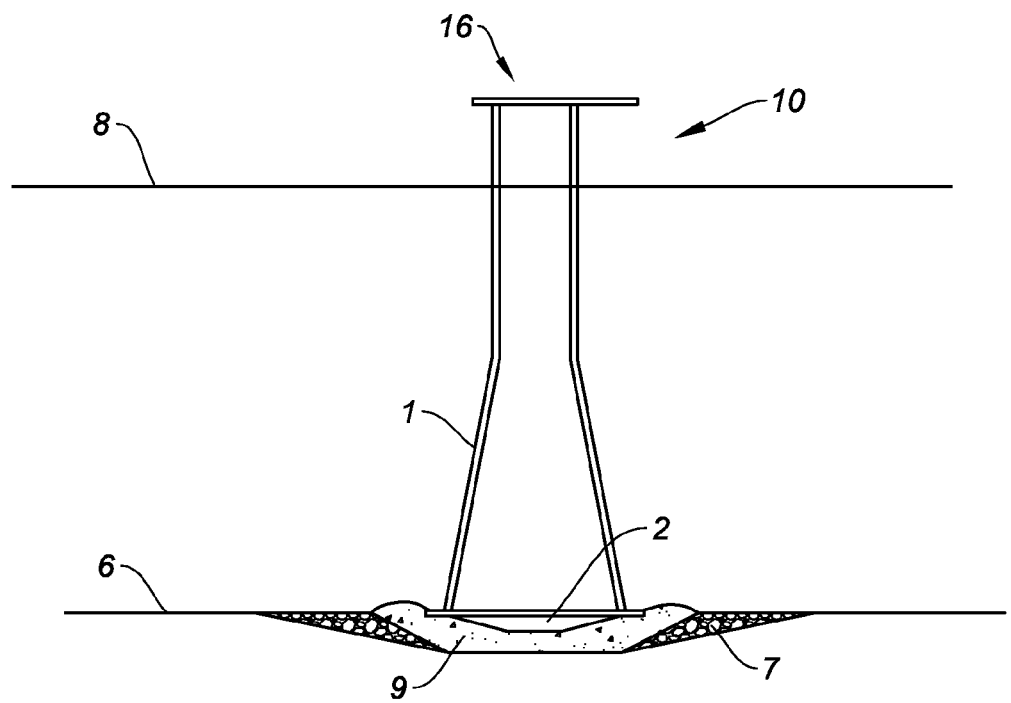
FIG. 7B is a side view illustrating a step of lowering of the single-floater platform into the concrete bed 9 to form a mirror-image reversed cone indentation in the concrete bed with the cone-shaped bottom slab.

FIG. 7A is a side view of the single-floater platform 10 to illustrate a step of hovering platform 10 just above the concrete bed 9, and FIG. 7B is a side view illustrating a step of lowering of the single-floater platform 10 into the concrete bed 9 so as to form the mirror-image reversed cone indentation in concrete bed 9 with the cone-shaped bottom slab 2. In FIG. 7A, prior to the concrete being set, the platform 10 is lowered so as to hover above the concrete bed 9 in the seabed 6. As shown in FIG. 7B, the platform 10 has been further lowered so as to be at a design level, with the cone-shaped bottom slab 2 completely immersed within the still wet concrete bed 9.

Figure 8A:
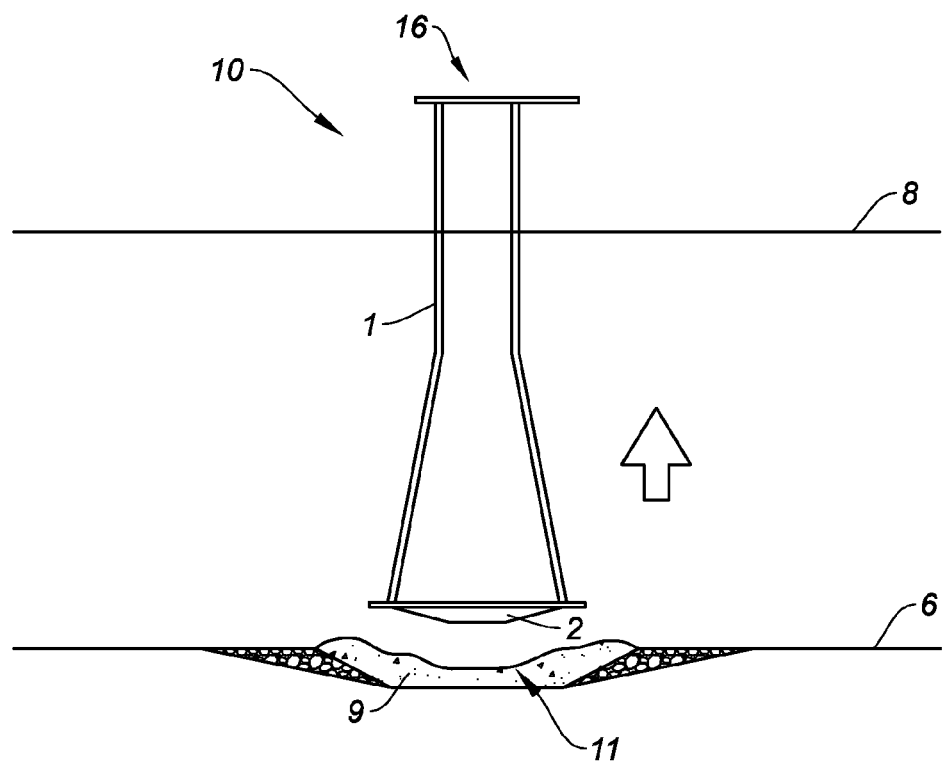
FIG. 8A is a side view of the single-floater platform to illustrate a step of raising the platform to reveal the mirror-image reversed cone indentation in the concrete bed.
Figure 8B:
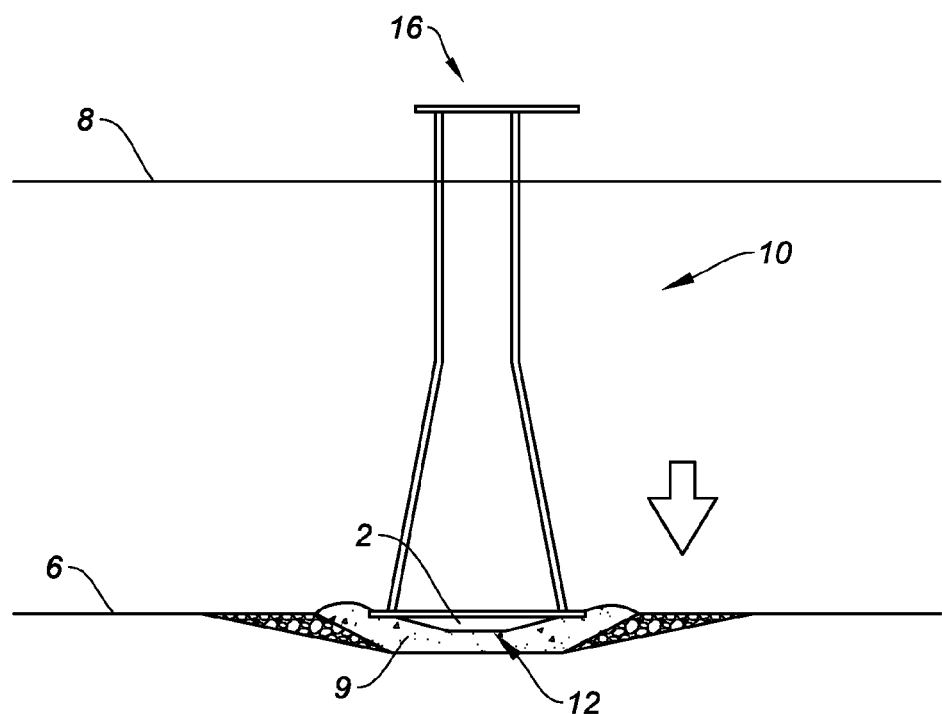
FIG. 8B is a side view of the single-floater platform to illustrate a step of again lowering the platform to rest the cone-shaped bottom slab in the mirror-image reversed cone-shaped indentation.

FIG. 8A is a side view of the single-floater platform 10 to illustrate a step of raising the platform to reveal the mirror-image reversed cone indentation in concrete bed 9, and FIG. 8B is a side view of the single-floater platform 10 to illustrate a step of again lowering the platform 10 so that the cone-shaped bottom slab 2 rests in the mirror-image reversed cone-shaped indentation 11. The position of the platform 10 is maintained on the concrete bed 9 until the wet concrete which forms the concrete bed 9 is at an initial set where it begins to harden. Thus, as shown in FIG. 8A, the platform 10 is thereafter raised once the concrete in the concrete bed 9 has set (hardened), leaving a mirror-image reversed cone-shaped indentation 11 in the concrete bed 9. In FIG. 8B, the platform 10 is lowered again to rest on the concrete bed 9 with the cone-shaped bottom slab 2 fitting snugly in the mirror-image reversed cone indentation 11 in concrete bed 9.

Any material that is present between the cone-shaped bottom slab 2 and the reverse cone-shaped indentation 11 is then flushed out using the high pressure water jets through pipes 37 in the pressure piping system to separate the two and create a gap therebetween. Once flushing is completed, the platform 10 is again raised, then lowered so that the cone-shaped bottom slab 2 contacts the reverse cone-shaped indentation 11 with the gap therebetween. The gap present between the two faces or meeting surfaces of the cone-shaped bottom slab 2 and reverse cone-shaped indentation 11 is then subject to pressure grouting with cement grout 12. This is done using the pipes in the pressure piping system so as to finally fix the marine platform 10 to the concrete bed 9.

Figure 9:
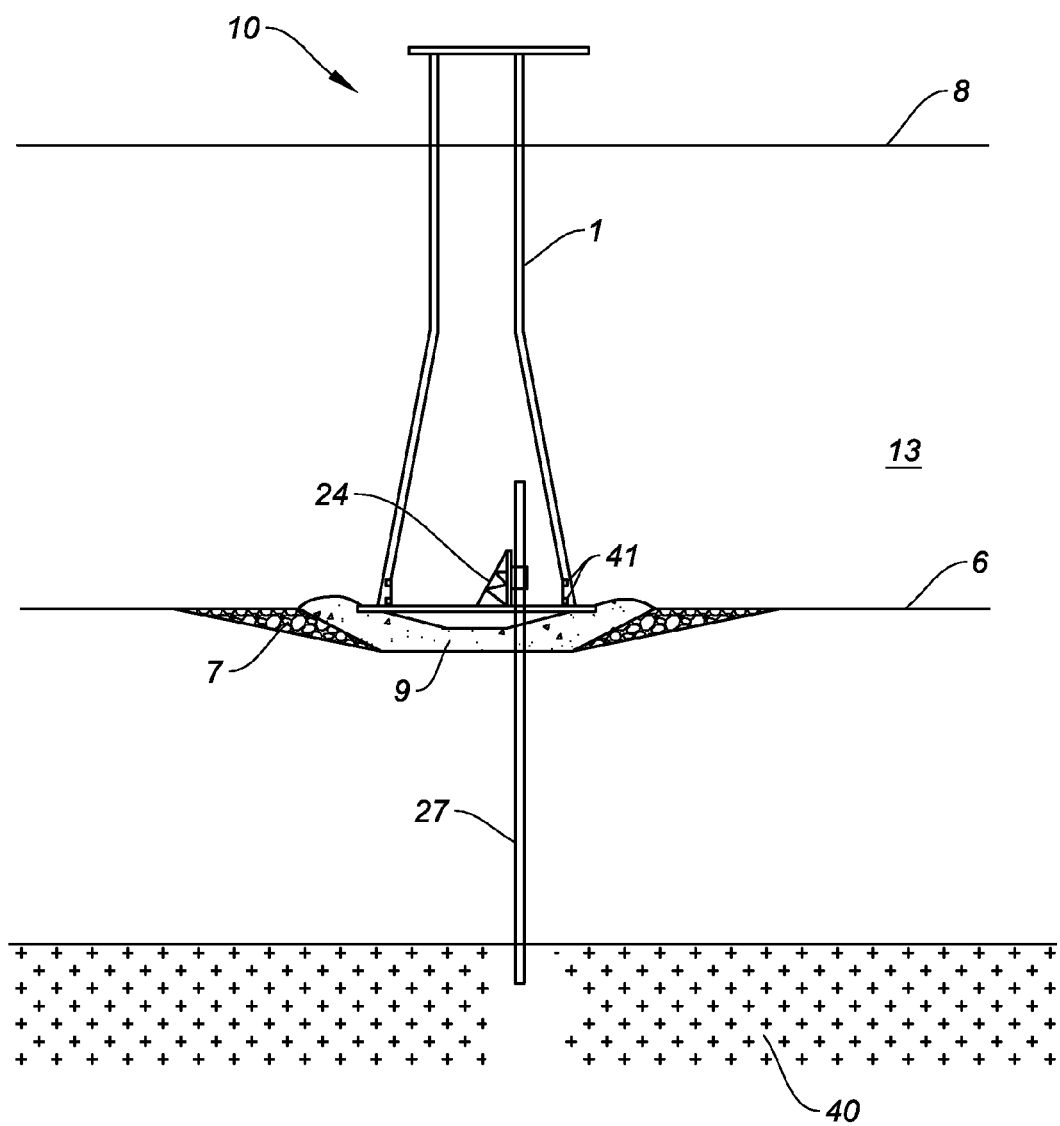
FIG. 9 is a side view of a marine platform fixed to a concrete bed 9 to illustrate a step of installing a small diameter pile with a boring plant.
Figure 10A:
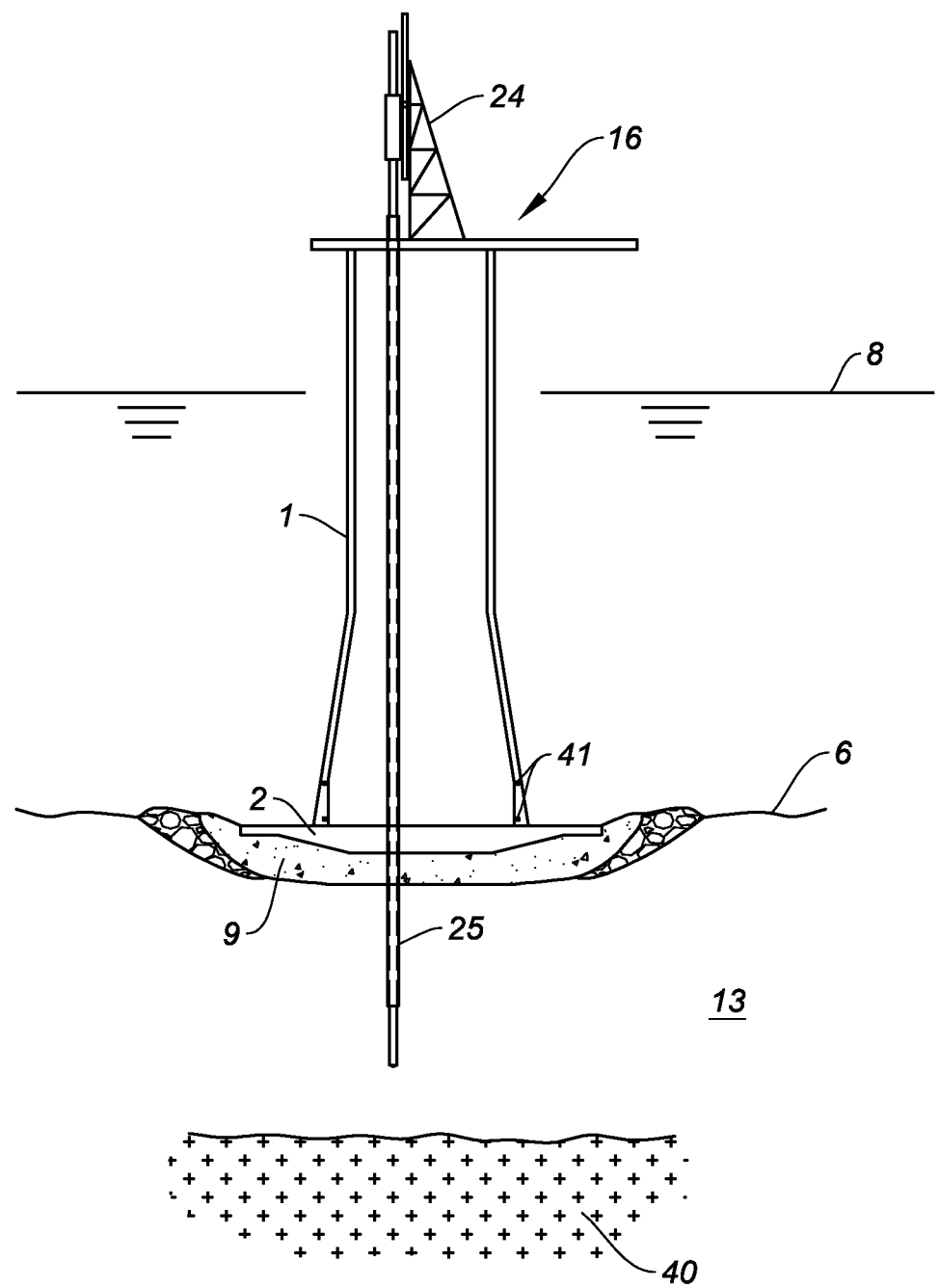
FIG. 10A shows a boring plant executing boring of a pile using a casing from the top end of a marine platform.
Figure 10B:
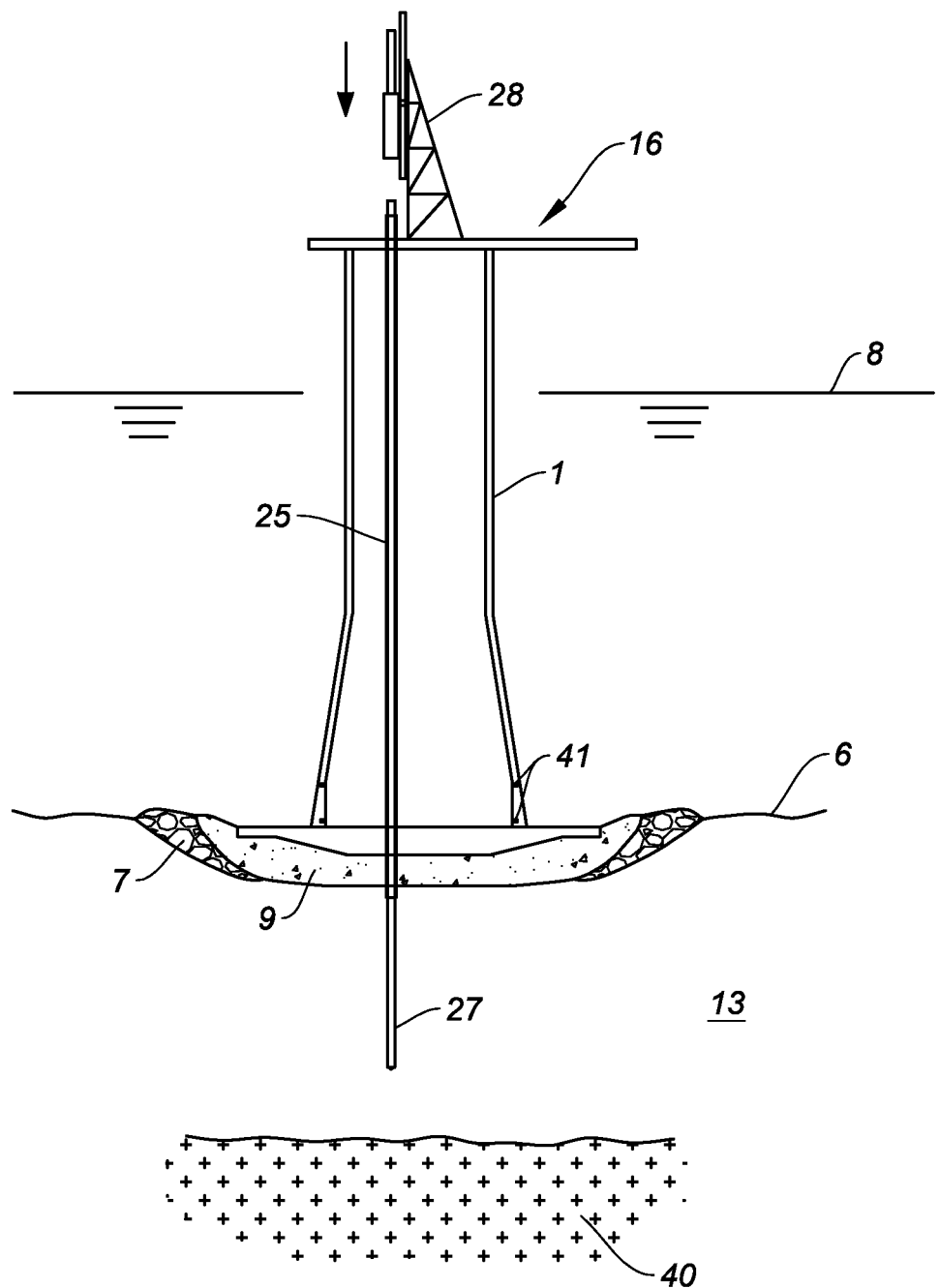
FIG. 10B shows a piling plant driving a pile downward through a casing from the top of a marine platform.
Figure 11:
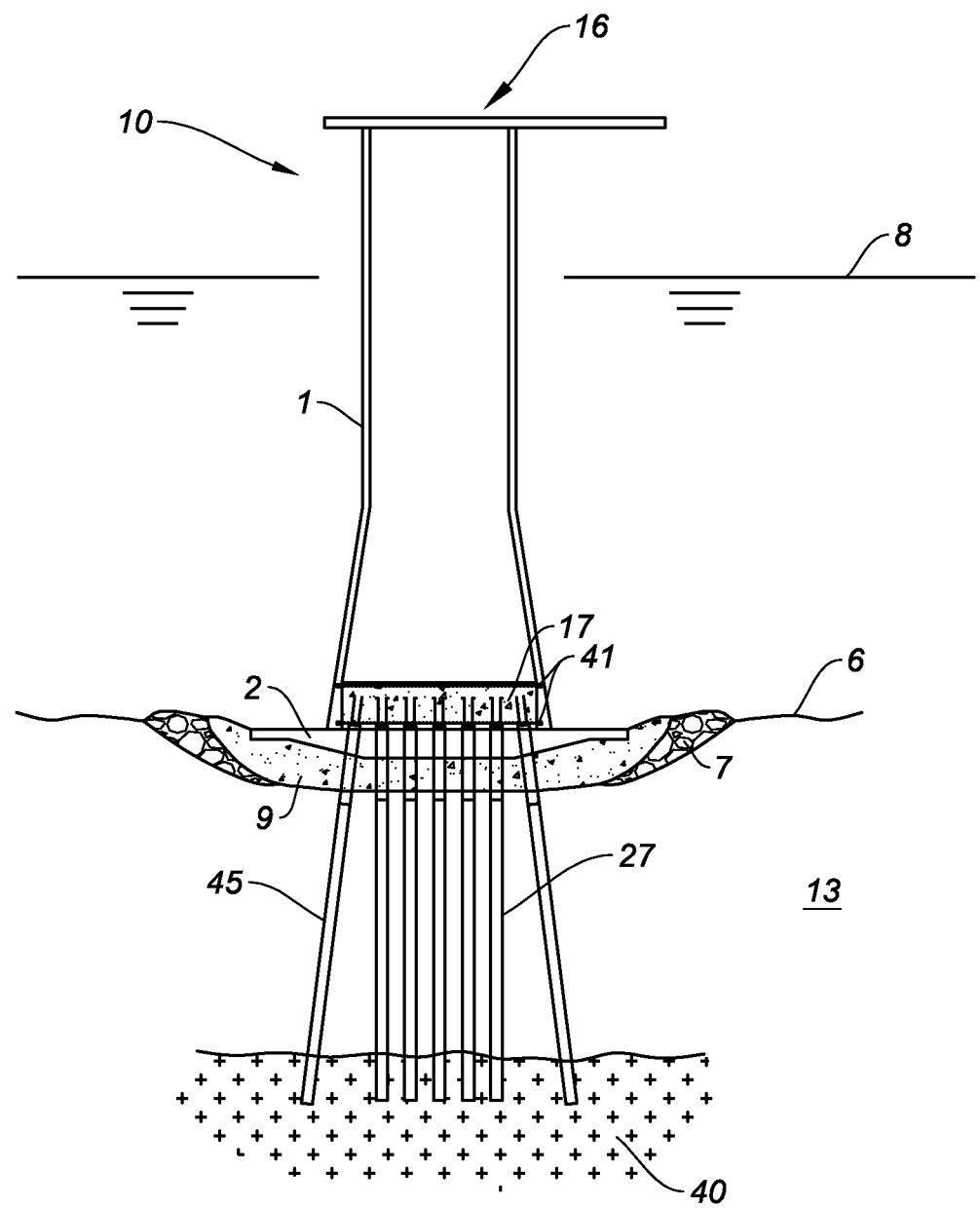
FIG. 11 is a side view of a platform fixed to a concrete bed with a complete piling support arrangement.

FIGS. 9-11 are provided to illustrate an optional process in the construction method to provide a piling support arrangement for the fixed marine platform 10. In FIG. 9, which is a side view of the platform 10 fixed to the concrete bed 9, there is shown a small diameter pile 27 being installed with a small boring plant 24 situated within the interior of floater 1 at the bottom thereof. This is done for each pile 27. As is known, the boring plant 24 is used for installing a pile by a boring action to bore a hole in the concrete bed 9 and soil/sand strata 13, with or without a casing 25 depending on the soil properties. Typically, a casing 25 will be used in the top region of the soil/sand strata 13. Accordingly, a hole is bored through the concrete bed 9 and soil/sand strata 13 so that the pile 27 may be extended down through a recess hole 39 in the cone-shaped bottom slab 2 to penetrate the concrete bed 9, soil/sand strata 13 and finally to be socketed into bedrock 40. FIG. 9 also initially illustrates steel bar connectors 41 (a mechanical connector) which are embedded in the interior wall of the bottom segment of the floater 1 at time of casting the bottom segment at the factory. As will be shown hereafter, ends of a plurality of pile cap reinforcement bars 42 are connected (via short steel bars 48) and fixed to these embedded bar connectors 41 prior to casting of the pile cap 17 within the interior of floater 1.

FIG. 10A shows the boring plant 24 executing boring of a pile 27 using a casing 25 from the top end of the platform 10. FIG. 10B shows a piling plant 28 driving a pile 27 downward through the casing 25 from the top of the platform 10. As is known, the piling plant 28 could be embodied as a boring plant or percussion plant and is used to drive a pile into the soil/sand strata 13 and bedrock 40 by force.

FIG. 11 is a side view of the platform 10 fixed to the concrete bed 9 with a complete piling support arrangement. The piling support arrangement includes a plurality of small diameter piles 27 (and optionally raking piles 45) having been installed with their lower ends socketed in the bedrock 40, and with their upper ends having been cut to level and concrete at the top of the outer casings of the piles 27 broken away so as to expose internal steel bars 43 at the top of the piles 27 that are secured within a pile cap 17 that is cast into the bottom of the floater 1.

To realize the final piling support arrangement, and after the lower ends of the piles (which penetrate through the concrete bed 9, soil/sand strata 13 between the seabed 6 and bedrock 40) have been finally socketed into the bedrock 40, the interior of the floater 1 is dewatered. This may be accomplished either by pumping the water out, or by forming a concrete plug at the lower end therein to stop water seepage prior to dewatering for a dry working environment. Next, the upper ends of the piles 27 (and 45) are cut to level in preparation for a known casting procedure to form a pile cap 17 within the interior of the floater 1 at a lower end thereof. The pile cap 17, once cast, secures the upper exposed internal steel bars 43 extending from the upper ends of the piles 27 therein.

Figure 15:
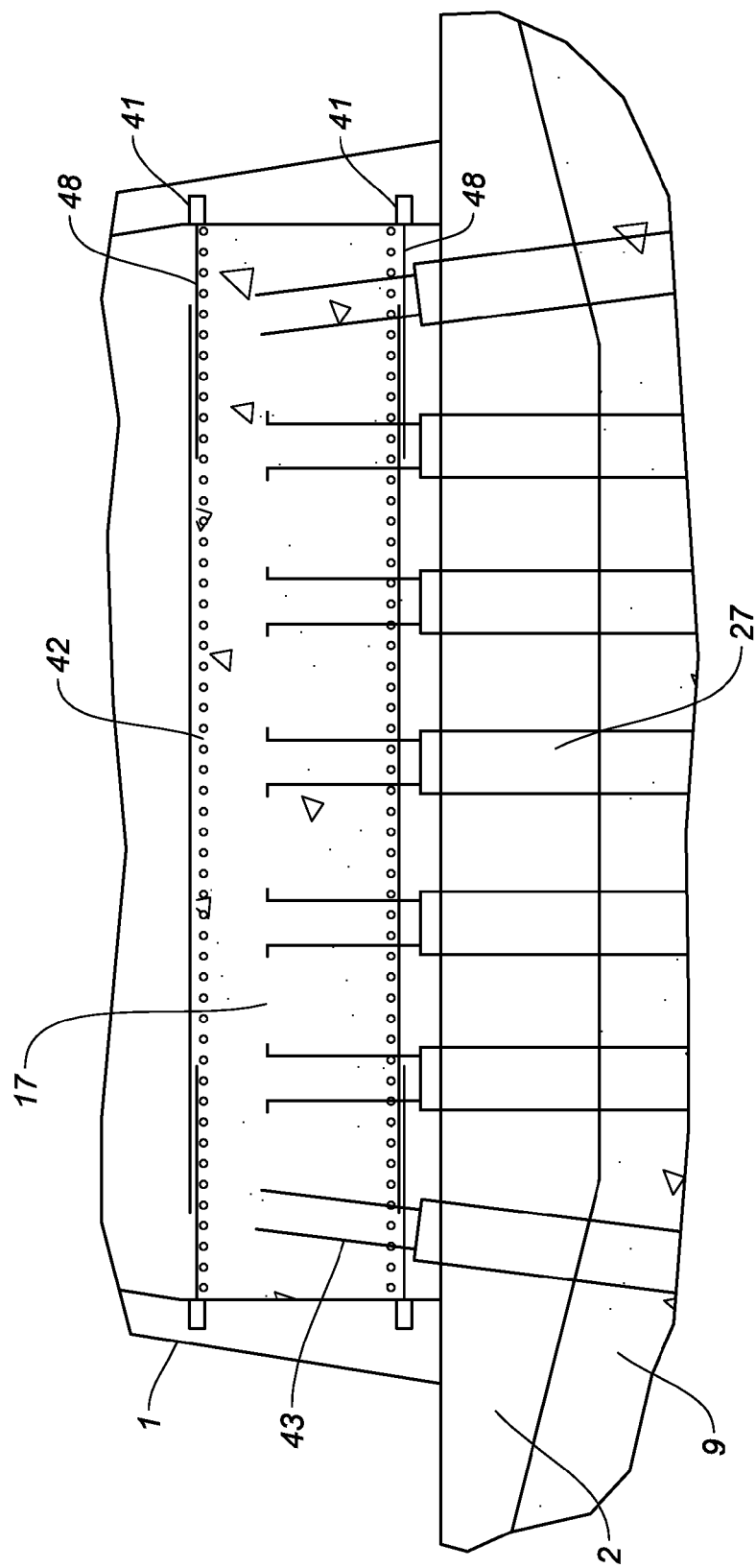
FIG. 15 is an enlarged front view of a lower portion of the floater.

FIG. 15 is an enlarged front view of a lower portion of the floater 1 to help illustrate the steps of securing the upper ends of the small diameter piles 27/raking piles 45 and forming the pile cap 17 to complete the piling support arrangement. Recall that the inner wall at the floater 1 lower end includes the plurality of steel bar connectors 41 embedded therein. Also recall that prior to casting the pile cap 17, the upper ends of the piles 27/45 are leveled and concrete in the outer casings thereof broken away to expose internal steel bars 43 at the top of the piles 27.

Further, and also prior to casting of the piling cap 17, short steel bars 48 are attached to the bar connectors 41, and a plurality of horizontally extending steel pile cap reinforcement bars 42 that are transverse to the bar connectors 41 are arranged between the embedded bar connectors 41 and connected to the bar connectors 41 via the short bars 48. Connection points between ends of the short steel bars 48/ends of the pile cap reinforcement bars 42 and ends of the short steel bars 48/bar connectors 41 are then lapped with steel, fixing them together. Thereafter, concrete to form the pile cap 17 is cast within the floater 1 to complete the installation of the piling support arrangement.

Work Example 5

The casting of the concrete bed 9 on the seabed 6 optionally can be formed without employing excavation vessels as indicated above, provided that geological conditions of the seabed 6 are favorable.

In this example, the platform 10 is equipped with a high pressure water jet and a concrete pipe which opens to the water side in the bottom slab 2. For shallow bedrock 40 in the seabed 6 with a layer of relatively thin soft material, the concrete bed 9 can be made by the platform 10 itself.

Initially, the platform 10 may be floated into position at a desired location within the marine environment and sunk to the bottom of the seabed 6 by taking in water. When it is sitting firmly in the seabed 6, high pressure jets from nozzles in the bottom slab 2 are used to clear soft material, until bedrock 40 or the designed founding layer is exposed, thus forming the potholes 15 in the seabed 6. Next, a built-in tremie concrete down pipe provided in the floaters 1 is used to pour the wet concrete into the water jet cleared potholes 15, and at the same time the position and level of the platform 10 is adjusted and maintained to allow the concrete pour to completely cover the coned-shaped bottom slab 2, and level with the stiffened ring slab 4 (if any).

After the concrete has hardened, the platform 10 is raised by reducing its water ballast, so that the concrete bed 9 can undergo curing without the influence of wave and current that the platform 10 would have endured otherwise, if it remained in the concrete bed 9. After the concrete bed 9 (with the mirror image, reverse cone-shaped indentation 11) has cured so as to reach its design strength, the platform 10 is then lowered again and sits on the concrete bed 9 so that the coned-shaped bottom slab 2 slides in the mirror image, reverse cone-shaped indentation 11 formed in the concrete bed 9. Thereafter, by using the pre-installed pressure piping 37 to inject cement grout 12, a gap formed between the faces or meeting surfaces of coned-shaped bottom slab 2 and mirror image, reverse cone-shaped indentation 11 is filled with the cement grout 12 so as to finally fix the floater 1 onto the seabed 6.

The present application also provides a method of assembling the marine platform 10 at a harbor site. The method includes a step of segmental match casting, in a factory or casting yard, of a plurality of first segments to be assembled into the hollow, cylindrical buoyancy tube (i.e., floater 1) to be disposed vertically in the marine environment. In an example, the assembled marine platform 10 may include a plurality of floaters 1. Additionally, the method includes segmental match casting, in the factory or casting yard, of a plurality of second segments to be assembled into an elongate horizontal beam (32 and/or 34) to be connected between adjacent floaters 1. In an example, the assembled marine platform 10 may include a plurality of horizontal beams 32, 34 interconnected between a plurality of sets of adjacent floaters 1.

At least three guiding piles for each floater 1 are installed, at the harbor site, at the location where the floater 1 is to be assembled, to be used as a confining mechanism for confining a first segment into position and supporting the weight thereof by an overhead frame/truss.

The plurality of cast first segments to assemble the floaters 1 is then transported to the harbor site. A first segment (that is to be the bottom segment of the to-be-assembled floater 1) is lifted into position by use of a floating crane, and guided by the guiding piles, the bottom first segment being floatable under its own weight and the weight of an immediate first segment placed on top of it. Of note, the bottom first segment is cast at the factory yard with the plurality of bar connectors 41 embedded within an inner wall thereof. A next first segment is lifted and placed onto the bottom first segment, with pre-stressing being used to join this next first segment to the bottom first segment. The processes of lifting and joining are repeated for subsequent first segments to complete the assembling of the floater 1, each of the assembled floaters 1 including one or more joints for connection to one or more horizontal beams 32/34.

The completed floater 1 is then hung so that it extends vertically from the overhead frame/truss and is restrained by the guiding piles, in preparation for connection to the horizontal beams 32/34. Next, the plurality of second segments to make up the beams 32 and/or 34 is transported to the harbor site. These second segments are also assembled by the use of pre-stressing to join the second segments together so as to form the horizontal beam 32 and/or 34. Each completed or formed horizontal beam 32, 34 is then sequentially lifted by a floating crane onto a temporary support on the guiding piles. Steel bars in both the floaters 1 and completed beams 32, 34 are then fixed together and thereafter lapped with steel.

All the joints where ends of horizontal beams 32, 34 meet a floater 1 are then cast with in-situ concrete until all beams 32 and/or 34 are fixed to the floaters 1. The overhead frame/truss and guiding piles are then removed from the assembly location at the harbor site, with the completed marine platform 10 configured to be floated out into the marine environment. Optionally, a wind turbine 5 may be installed on top of one of the floaters 1 of marine platform 10.

Figure 16:
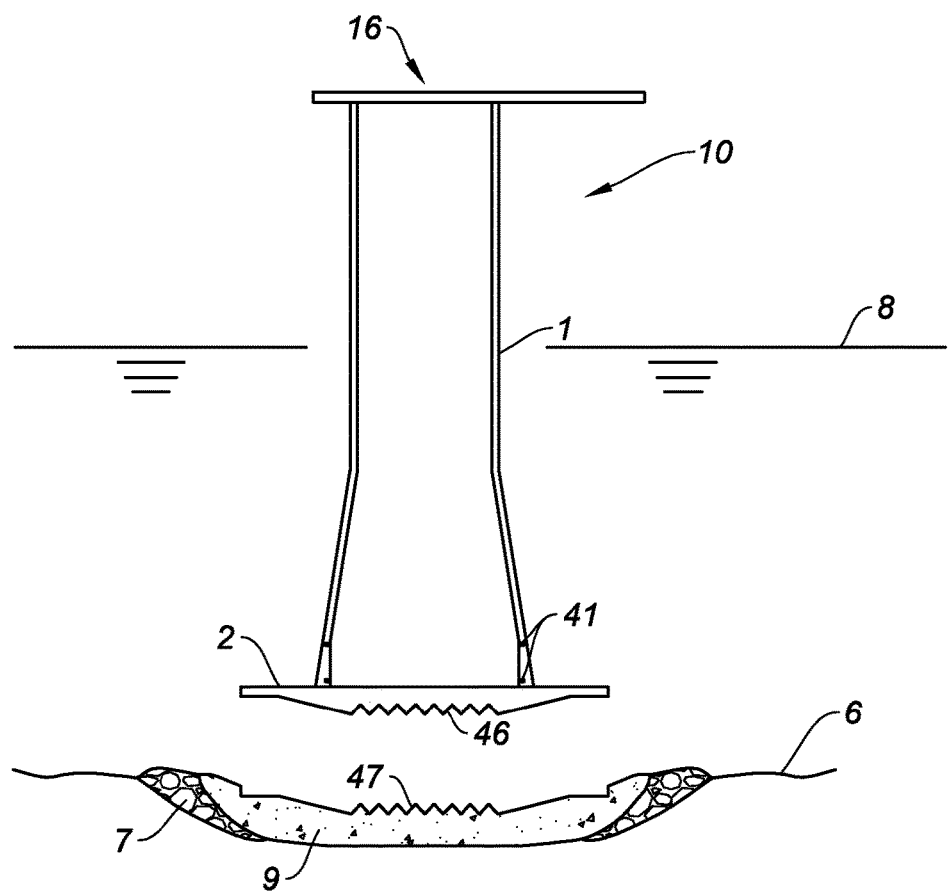
FIG. 16 is a side perspective view of a single-floater marine platform in which the bottom slab has a different shape configuration on an underside thereof.

As previously described above, the bottom slab 2 may be conically-shaped, either as a single cone shape or as a plurality of cone-shapes, with the apex of the cone pointing downward toward the seabed/seafloor. FIG. 16 is a side perspective view of a single-floater marine platform 10 in which the bottom slab 2 has a plurality of cone shapes 46 on an underside thereof. As part of the above-described method of installing the platform 10 in the marine environment, these cone shapes 46 become immersed in the still wet concrete within concrete bed 9 so as to form a plurality of mirror-image reversed multi-cone-shaped indentations 47, as shown in FIG. 16.

The example embodiments hereinabove having been described, it will be apparent to those skilled in the relevant art that some features that are not particularly important to an understanding of the partially floating supported marine offshore platform 10 may not be shown for the sake of clarity.

Further, it should be understood that the partially floating supported offshore platform 10 for offshore wind turbines, bridges and buildings disclosed herein is not limited to the specific example embodiments described above. Various changes and modifications thereof may be effected by one skilled in the art without departing from the spirit or scope of protection. For example, elements and/or features of different illustrative embodiments may be combined with each other and/or substituted for each other within the scope of this disclosure.

What is claimed is:

1. An offshore platform for a marine environment, the platform configured to support offshore wind turbines, bridges and marine buildings thereon and adapted for a water depth greater than 5 meters in the marine environment, comprising:
   a regulating tower section supporting at least one offshore wind turbine thereon,
   at least one hollow, cylindrical buoyancy tube having an upper end attached to the regulating tower section and a tapered lower end extending downward from the tower section towards a seabed of the marine environment, and
   a concrete bed cast beneath a surface of the seabed and configured to support the tapered lower end of the at least one buoyancy tube therein, wherein
   the tapered lower end is a cone-shaped bottom slab having a flat top surface with the apex of the cone-shaped bottom slab pointing downward towards the seabed,
   the concrete bed within the seabed includes a mirror-image or reversed cone-shaped indentation that is to receive the cone-shaped bottom slab therein, the reversed cone-shaped indentation having been formed in the concrete bed by the cone-shaped bottom slab of the at least one buoyancy tube prior to the concrete bed hardening to a final design strength, and the cone-shaped bottom slab is fixedly secured within the reverse cone-shaped indention of the concrete bed to support the regulating tower section with the at least one offshore wind turbine thereon.

2. The offshore platform of claim 1, further comprising:
a plurality of elongate piles having upper ends attached to the cone-shaped bottom slab and extending toward the seabed with lower ends thereof affixed to bedrock below the seabed, the piles with the cone-shaped bottom slab providing a counter force to counterbalance an uplifting force of the at least one buoyancy tube.

3. The offshore platform of claim 1, the platform further comprising a plurality of buoyancy tubes interconnected by a plurality of horizontal beams so as to form a triangular-shaped offshore platform, wherein at least one of the buoyancy tubes supports a wind turbine thereon.

4. The offshore platform of claim 1, further comprising:
a stiffened ring slab extending outward from the cone-shaped bottom slab to increase surface area so as to further reduce bearing pressure.

5. The offshore platform of claim 1,
wherein a height of the regulating tower section configured so as that at least a portion of the regulating tower section extends above a determined maximum wave height in the marine environment.

6. The offshore platform of claim 1, further comprising:
a pressure piping system installed within the hollow interior of the at least one buoyancy tube, and
one or more valves provided at an upper end of the at least one buoyancy tube, the valves connected to the pressure piping system and connectable to a source of high pressure water for pumping a high pressure water jet through the pressure piping system to remove soft material on the seabed, to flush out any material present between the cone-shaped bottom slab and the reverse cone-shaped indentation to create a gap between a face of the coned-shaped bottom slab and the surface of the reverse cone-shaped indentation in the concrete bed, and to pressure grout the gap so as to fixedly secure the coned-shaped bottom slab within the concrete bed.

7. The offshore platform of claim 1, wherein the at least one buoyancy tube is filled with one of sand and water to increase self-weight of the offshore platform so as to counter an uplifting force induced by wind loads on the platform.

8. An offshore platform for a marine environment, comprising:
a plurality of buoyancy tubes, at least one of the buoyancy tubes supporting a wind turbine attached at an upper end thereof, a lower end of each buoyancy tube configured as a cone-shaped bottom slab with a flat top surface, where an apex of the cone-shaped bottom slab points downward towards the seabed,
a plurality of horizontal beams interconnected between the buoyancy tubes so that the offshore platform has a triangular shape, and
a plurality of concrete beds formed within the seabed, each concrete bed associated with a respective buoyancy tube, wherein
each concrete bed includes a reversed cone-shaped indentation to which the cone-shaped bottom slab of its corresponding buoyancy tube is to be fixed within, the indention having been formed in the concrete bed by the cone-shaped bottom slab prior to the concrete bed hardening to a final design strength.

* * * * *